April 18, 1933. J. KOHL 1,904,003
PROCESS AND PLANT FOR EXTRACTING GLUE FROM GLUE CONTAINING MATERIAL
Filed March 17, 1931
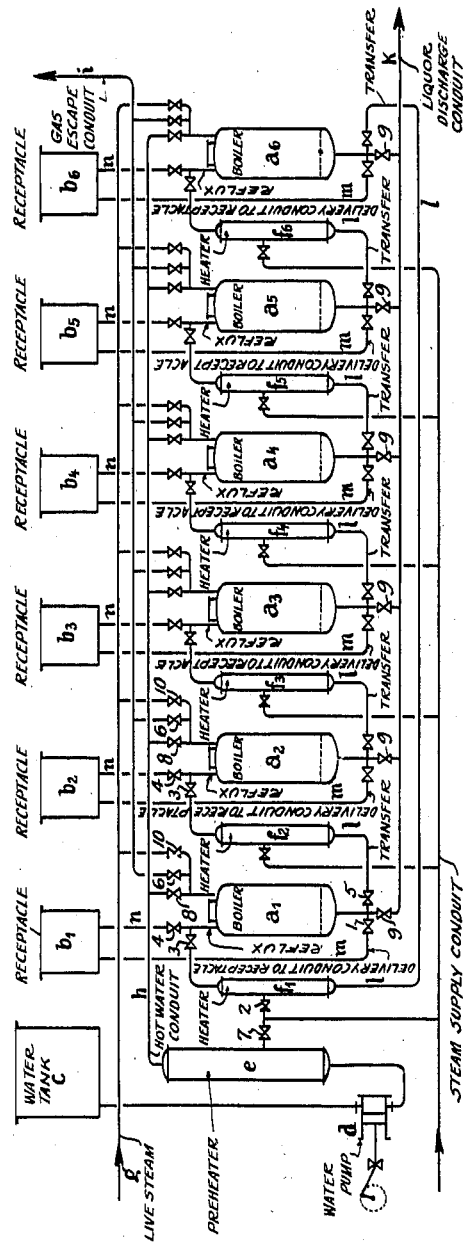
INVENTOR
Julius Kohl,
BY
ATTORNEYS Patented Apr. 18, 1933

1,904,003

UNITED STATES PATENT OFFICE

JULIUS KOHL, OF BERLIN, GERMANY

PROCESS AND PLANT FOR EXTRACTING GLUE FROM GLUE-CONTAINING MATERIAL

Application filed March 17, 1931, Serial No. 523,350, and in Germany April 8, 1930.

It has hitherto been customary to extract the glue from suitably pretreated crushed bones in batteries of boilers comprising four or more separate boilers which, operating according to the counter current principle, permitted a concentration of the liquors from boiler to boiler.

As is well known, the glue substance in the crushed bones is not yet in soluble form but has to be converted into this form by steam pressure. But only a fraction of the glue-yielding substance is transformed into glue each time, so that in the methods customary hitherto these pressures had to be repeated very often, in some cases as many as fifteen times, in order to extract all the glue-yielding substance. After each treatment with steam the glue produced was lixiviated by being allowed to stand in hot water for a duration of 1-2 hours.

The battery of boilers operated in such a way that the liquors of one boiler were forced over in the direction against the fresh material in the next, preferably by means of steam pressure. The boiler thus emptied of liquid then received a steam pressure and was then filled up again with the liquid of the preceding boiler, whereupon this latter received steam pressure and so on. When a boiler had accomplished the prescribed number of steam pressures and periods of standing in water, the bones had been de-glued and the boiler was emptied. Simultaneously a boiler filled with fresh bones would be put into the circuit at the other end of the battery instead of the empty boiler.

The method customary hitherto has a number of disadvantages which unnecessarily prolong the duration of the process and also have an injurious effect on the glue product formed both as regards quality and quantity.

The object of the invention is to provide a new process offering considerable advantages in comparison with the process customary hitherto.

Systematic testing of the known process has enabled the inventor to discover how such improvement may be effected. In the first place the inventor has ascertained by comparative tests that the lixiviation proceeds more rapidly and thoroughly if during the operation the lixiviating waters or liquors are kept in a state of constant progressive movement through the battery.

As shown by the above description of the usual process, such a kind of lixiviation was not formerly possible. On the contrary the lixiviation had to be carried out with still water, whereby large quantities of glue remained in the bones under treatment. This fact, unfavourable as regards the time required for the operation, also had an injurious effect as regards the quality of glue attainable, since when the water was expressed before the commencement of the next period of steaming amounts of glue remaining in the bones, loosened but not lixiviated, were considerably harmed in their quality by the subsequent steam pressure.

A further defect of the former process, also arising from the impossibility of lixiviating with running water, consists in the fact that the quantities of liquid which it is possible to use in one period of lixiviation are rigidly restricted upwardly by the capacity of a boiler filled with crushed bones.

The inventor has ascertained however that it is of great advantage to work with larger quantities of water, and this is easily possible when the flowing method of lixiviation is employed.

The thorough lixiviation of the glue loosened by one steam pressure by the "flowing" method has the direct consequence that in the new process a considerably smaller number of steam pressures is sufficient than in the process customary hitherto.

Since, as shown above, the steam pressure has an injurious effect on the quality of the glue obtained, the decrease in the number of steam pressures employed causes, besides a saving in heat energy, an improvement in the quality of the glue obtained. Obviously, the maximum possible degree of glue extraction of the bone material is also increased by the new process.

It has also been ascertained that the repeated pressure of the glue liquor from one boiler to the other by means of steam which was essential according to the old process has an injurious effect on the quality of the glue obtained. The inventor therefore proposes new means for effecting the advancement of the lixiviating liquid without the use of steam pressure.

Accordingly the subject of the invention is a process for extracting glue from glue-containing material such as crushed bones or the like in a battery of boilers by alternate steam-pressure treatment and lixiviation, the essential feature of the process consisting firstly in the fact that during each period of steam pressure all boilers in operation are emptied of liquid and placed under steam pressure.

This is preferably effected by causing the liquid contents of each boiler to be held ready in a separate receptacle during the steam pressure periods and to be returned again to the relevant boiler at the conclusion of each steam pressure period.

The second main feature of the invention consists in the fact that during each period of lixiviation the lixiviating liquid is passed in a continuous current through the battery, the liquid flow necessary for this purpose being preferably set up by forcing in pure water to follow the lixiviating liquid. According to the invention the fresh water is pumped into the boiler containing the most completely de-glued bones so that a current is set up in the direction of the least completely de-glued boiler, which forces the saturated liquors towards the outlet.

The battery to be used for carrying out the new process is equipped in known manner with several boilers connected together by pipe conduits comprising opening and closing means, and is so arranged that each boiler is provided according to the invention with a separate liquid receptacle.

An important new part of the plant is a hot water pump whose pressure side may be connected to any boiler. A liquid preheater is preferably disposed before each boiler.

Summarized briefly, the following advantages are attained by the use of the new process in comparison with the old.

1. With the same raw material the quality of the glue is considerably improved.

2. The desired quicker extraction of glue is attained and it is therefore possible to reduce the number of extraction pressures by about a half and thus effect considerable saving in steam and coal.

3. The bones are de-glued more thoroughly than in the old process. The usual nitrogen analysis shows a much smaller content of nitrogen in the de-glued bones produced with the new process under other wise similar conditions.

An embodiment of a plant for carrying out the new process is illustrated diagrammatically and by way of example in the drawing.

A battery of for instance six boilers $a_1$ to $a_6$, is so connected by conduits $h$ and $l$ that through the action of a pump $d$ on any desired boiler the water pumped in or the liquor of the remaining boilers passes through the connecting pipes right through the whole battery.

In order easily to retain the desired temperature of the lixiviating liquors, the outlet pipes are made to pass through heating devices $f_1$ to $f_6$. Moreover the battery is provided with conduits $m$ so that after closing the respective valves indicated in the drawing, the liquid content of each boiler is forced separately into one of the receptacles $b_1$ to $b_6$ by means of steam or compressed air or a pump. Obviously these receptacles $b_1$ to $b_6$ which are here shown as being elevated could be arranged beneath the battery.

Furthermore the battery is so arranged that the liquors contained in the receptacles $b_1$ to $b_6$ can return again ($n$) to the boilers from which they were drawn off. The pump $d$ is connected to a water tank $c$ from which it can supply water through a preheater $e$ of suitable proportions, through the conduit $h$ to any desired boiler. Further, each boiler of the battery is provided with a live steam supply $g$ and air exhaust conduit $i$. The conduit $k$ permits the liquor to be run off from any desired boiler by suitably adjusting the valves indicated.

The valve arrangements as illustrated in the form shown in the drawing comprise, for each boiler-receptacle-heater unit, the valve 1 located on the delivery conduit from the bottom of the boiler to the corresponding receptacles; the valve 2 for the supply of steam from conduit $g$ into the heater $f_1$—$f_6$; the valve 3 for the delivery of liquor during the transferring operation from one boiler through the corresponding transfer conduit $l$ to the next in series; the valve 4 on the reflux conduit $n$ between a receptacle and its corresponding boiler; the valve 5 for controlling the flow of liquor from a boiler during the forwarding operation, to permit the liquid to flow into a heater; the valve 6 through which vapors in the boiler may be discharged to the gas escape conduit $i$; the valve 8 for the delivery of fresh hot water into the boiler (from the hot water conduit $h$) when it is placed in operation; the valve 9 for the discharge of concentrated glue liquor from the boiler to the liquor discharge conduit $k$ when the boiler is being brought out of a series for recharging; and the valve 10 for admitting live steam from conduit $g$ into the boiler for the steaming operation, as well as for the accomplishing of the transfer or forwarding operation when the boilers are connected in series.

The manner of operation is as follows:

Assuming that boilers $a_1$ to $a_5$, which are operated according to the principle of countercurrent lixiviation, have had one period of lixiviation and are filled with water or liquor. Boiler $a_6$ is being emptied or refilled, the liquor having been drawn off through the corresponding valve 9 and conduit $k$. Now in order to be able to loosen further quantities of glue in the bones by means of steam, after closing all valves except valves 1 and 10 of the boilers $a_1$ to $a_5$, so that as indicated the liquid contents of each boiler are forced separately into the respective receptacles $b_1$ to $b_5$. Steam pressure, air pressure, or pump action may be used for this purpose. As soon as the boilers are emptied of their liquid content, the valves 1 are closed and the boilers receive through the valves 10 the steam pressure desired to loosen further quantities of the glue yielding substance, this steam being exhausted after the prescribed length of time through conduit $i$, by opening valves 6. Valves 10 are then closed. The liquors are then allowed to flow back from the receptacles $b_1$ to $b_5$ into the boilers, by opening valves 4. There they find new loosened glue-yielding substance and are able to enrich themselves. This enrichment is substantially favoured and accelerated by switching on the pump $d$ and suitably adjusting the temperature of the lixiviation liquors by means of the heating devices $f_2$ to $f_5$. In the example given the action of the pump supplies hot water into the boiler $a_1$ containing the most highly extracted material, by opening the valve 8 leading to boiler $a_1$ the valves 2, 3 and 5 of each unit in series are then opened, and the entering hot water delivered to boiler $a_1$ causes the liquor already therein to pass to $a_2$, pushing before it the liquid content of the battery from $a_1$ to $a_5$ until finally the liquor runs off from the boiler $a_5$ with a higher concentration. The exhaust valves 6 are preferably closed during the refluxing and this transfer operation; and the last boiler in the series is connected to the discharge conduit by opening its valve 9.

When the pump has been operated until no more lixiviation worth mentioning is to be expected, the pump action is stopped and the alternation between steaming and lixivation repeated. In the example given the boiler $a_1$, is at this moment completely extracted; after running off its liquid contents it is emptied of de-glued bones and filled up afresh. In the given example the boiler $a_6$ is then put into the system and in the subsequent pump action the concentrated liquor then runs off from this boiler and so on.

I claim.

1. Process of extracting glue from glue-containing material which comprises preparing charges of the material of successive degrees of extraction, subjecting all charges to steam treatment, admitting an individual supply of extracting liquor to each charge, removing and collecting the liquor from each charge separately, again subjecting the charges to steam treatment, thereafter separately returning the collected liquors to the charges, transferring the liquor from each charge to a charge of a lesser degree of extraction, and continuing the sequence whereby a continual countercurrent flow is established of the liquors with the respect to the charges so that each batch of liquor is successively exposed to charges of lesser degrees of extraction and the charges are subjected to steam treatments in periods between the successive exposures.

2. Process of extracting glue from glue-containing material which comprises preparing charges of the material of successive degrees of extraction, by the action thereon of individual supplies of extracting liquor of concentration varying inversely with the degree of extraction of the associated charge, removing and collecting the liquor from each charge separately, subjecting the charges to steam treatment, admitting the withdrawn supplies of extracting liquor to the associated charges, transferring liquor from each charge to the charge of the next lesser degree of extraction, and continuing the sequence whereby a continual countercurrent flow is established of the liquors with respect to the charges so that each batch of liquor is successively exposed to charges of lesser degrees of extraction and the charges are in periods between the successive exposures subjected to steam treatments.

3. An extraction battery comprising a plurality of extraction vessels for receiving the charges of material to be extracted, independent liquor receptacles for said extraction vessel, valved transfer conduits independently connecting each extraction vessel with an associated receptacle, a steam supply conduit with valve means for connecting the same to all said extraction vessels whereby the contents of all the extraction vessels may be subjected to steam treatment, means for supplying fresh extraction liquor into the extraction vessel containing the least extracted material, and means for discharging extraction liquor from the extraction vessel containing material of highest extractable content.

4. A battery as in claim 3, including a preheater connected between said fresh liquor supply means and the extraction vessel to be supplied therefrom.

5. A battery as in claim 3, in which the fresh liquor supply means includes a conduit having independent valve connections to each extraction vessel, and the liquor discharge means includes a conduit having valve connections to each extraction vessel, whereby the extraction vessels may independently and successively be discharged and disconnected from the system for emptying and refilling with material to be extracted.

6. A battery as in claim 3, in which each transfer conduit includes a heating device so that each separate supply of liquor may be heated in its passage from one extraction vessel to another extraction vessel.

7. An extraction battery comprising a plurality of units each including an extraction vessel, a liquor receptacle, a valved conduit for joining said vessel and receptacle, and a liquor heater, and a valve conduit joining said heater to the extraction vessel; a steam main having valved connections to each of said vessels, means whereby all of said heaters may be warmed, an exhaust main having valved connections to each of said vessels, independent valved transfer conduits between each two said vessels whereby they may be connected in series, and means including a common main with valved connections for forcing fresh liquor into any of said vessels so that the liquor in each unit may be forwarded through said transfer conduits into another unit, and a common discharge main having valved connections to each of said units.

In testimony whereof I have signed my name to this specification.

JULIUS KOHL.